United States Patent
Brown et al.

(10) Patent No.: US 11,275,269 B2
(45) Date of Patent: *Mar. 15, 2022

(54) OPTICAL SHEET TENSIONING DEVICE

(71) Applicant: Manufacturing Resources International, Inc., Alpharetta, GA (US)

(72) Inventors: Mike Brown, Cumming, GA (US); Michael LeCave, Gainesville, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,826

(22) Filed: Jul. 27, 2020

(65) Prior Publication Data
US 2020/0355965 A1 Nov. 12, 2020

Related U.S. Application Data

(63) Continuation of application No. 16/250,649, filed on Jan. 17, 2019, now Pat. No. 10,768,483, which is a
(Continued)

(51) Int. Cl.
*G02F 1/13357* (2006.01)
*G02F 1/1333* (2006.01)
*G02F 1/1335* (2006.01)

(52) U.S. Cl.
CPC .. *G02F 1/133608* (2013.01); *G02F 1/133308* (2013.01); *G02F 1/133385* (2013.01);
(Continued)

(58) Field of Classification Search
CPC ......... G02F 1/133608; G02F 1/133308; G02F 1/133385; G02F 1/133603;
(Continued)

(56) References Cited

U.S. PATENT DOCUMENTS 1,812,919 A 7/1931 Balder
3,510,973 A 5/1970 Mazzocco, Sr.
(Continued)

FOREIGN PATENT DOCUMENTS

AU 2004283319 A1 5/2005
AU 2007216782 A1 9/2007
(Continued)

OTHER PUBLICATIONS

Wikipedia, Gradient-index optics, 2016.
(Continued)

*Primary Examiner* — Bao Q Truong
(74) *Attorney, Agent, or Firm* — Standley Law Group LLP; Jeffrey S. Standley; Adam J. Smith

(57) ABSTRACT

Assemblies for enhancing the optical quality of electronic images displayed at an electronic display layer are provided. At least one optical sheet is located adjacent to the electronic display layer within a housing. A number of tensioning subassemblies exert tensioning forces on the optical sheet. A first component of each tensioning subassembly is attached to a location along a perimeter of each optical sheet and a second component is connected to the first component and the housing.

20 Claims, 13 Drawing Sheets

Related U.S. Application Data continuation of application No. 15/252,959, filed on Aug. 31, 2016, now Pat. No. 10,261,362.

(60) Provisional application No. 62/212,662, filed on Sep. 1, 2015.

(52) U.S. Cl.
CPC .. *G02F 1/133603* (2013.01); *G02F 1/133606* (2013.01); *G02F 1/133311* (2021.01); *G02F 1/133322* (2021.01); *G02F 1/133331* (2021.01); *G02F 1/133628* (2021.01); *G02F 2201/36* (2013.01); *G02F 2201/38* (2013.01); *G02F 2201/50* (2013.01)

(58) Field of Classification Search
CPC ......... G02F 1/133606; G02F 1/133331; G02F 1/133322; G02F 1/133311; G02F 1/133628; G02F 2201/36; G02F 2201/38; G02F 2201/50

See application file for complete search history.

(56) References Cited

U.S. PATENT DOCUMENTS

| | | |
|---|---|---|
| 4,257,084 A | 3/1981 | Reynolds |
| 4,804,953 A | 2/1989 | Castleberry |
| 5,040,878 A | 8/1991 | Eichenlaub |
| 5,046,805 A | 9/1991 | Simon |
| 5,066,106 A | 11/1991 | Sakamoto et al. |
| 5,363,149 A | 11/1994 | Furuno et al. |
| 5,365,354 A | 11/1994 | Jannson et al. |
| 5,381,309 A | 1/1995 | Borchardt |
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,409,356 B1 | 6/2002 | Nishimura |
| 6,419,372 B1 | 7/2002 | Shaw et al. |
| 6,421,103 B2 | 7/2002 | Yamaguchi |
| 6,437,673 B1 | 8/2002 | Nishida et al. |
| 6,446,467 B1 | 9/2002 | Lieberman et al. |
| 6,481,130 B1 | 11/2002 | Wu |
| 6,556,258 B1 | 4/2003 | Koshida et al. |
| 6,601,984 B2 | 8/2003 | Yamamoto et al. |
| 6,636,003 B2 | 10/2003 | Rahm et al. |
| 6,683,639 B2 | 1/2004 | Scheper et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 6,982,686 B2 | 1/2006 | Miyachi et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,052,152 B2 | 5/2006 | Harbers |
| 7,053,557 B2 | 5/2006 | Cross et al. |
| 7,057,590 B2 | 6/2006 | Lim et al. |
| 7,178,963 B2 | 2/2007 | Ueda et al. |
| 7,190,416 B2 | 3/2007 | Paukshto et al. |
| 7,194,158 B2 | 3/2007 | Schultheis et al. |
| 7,210,839 B2 | 5/2007 | Jung et al. |
| 7,218,812 B2 | 5/2007 | Maxwell et al. |
| 7,232,250 B2 | 6/2007 | Chuang |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,324,080 B1 | 1/2008 | Hu et al. |
| 7,327,416 B2 | 2/2008 | Lee et al. |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,427,140 B1 | 9/2008 | Ma |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,542,108 B2 | 6/2009 | Saito et al. |
| 7,546,009 B2 | 6/2009 | Kukulj et al. |
| 7,682,047 B2 | 3/2010 | Hsu et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,853,288 B2 | 12/2010 | Ma |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,125,163 B2 | 2/2012 | Dunn et al. |
| 8,194,031 B2 | 6/2012 | Yao et al. |
| 8,233,115 B2 | 7/2012 | Hadlich et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,508,155 B2 | 8/2013 | Schuch |
| 8,529,993 B2 | 9/2013 | Charters et al. |
| 8,648,993 B2 | 2/2014 | Dunn et al. |
| 8,674,390 B2 | 3/2014 | Harris et al. |
| 8,674,963 B2 | 3/2014 | Cornish et al. |
| 8,803,790 B2 | 8/2014 | Wasinger et al. |
| 8,829,815 B2 | 9/2014 | Dunn et al. |
| 8,842,366 B2 | 9/2014 | Arnett et al. |
| 9,030,129 B2 | 5/2015 | Dunn et al. |
| 9,141,329 B1 | 9/2015 | Reicher et al. |
| 9,167,655 B2 | 10/2015 | Dunn et al. |
| 9,348,174 B2 | 5/2016 | Dunn et al. |
| 9,812,047 B2 | 11/2017 | Schuch et al. |
| 9,867,253 B2 | 1/2018 | Dunn et al. |
| 9,924,583 B2 | 3/2018 | Schuch et al. |
| 10,126,579 B2 | 11/2018 | Dunn et al. |
| 10,191,212 B2 | 1/2019 | Dunn |
| 10,261,362 B2 | 4/2019 | Brown et al. |
| 10,274,769 B2 | 4/2019 | Kil et al. |
| 10,290,786 B2 | 5/2019 | Hong et al. |
| 10,338,423 B2 | 7/2019 | Baek et al. |
| 10,431,166 B2 | 10/2019 | Wasinger et al. |
| 10,466,539 B2 | 11/2019 | Dunn et al. |
| 10,527,276 B2 | 1/2020 | Dunn et al. |
| 10,649,273 B2 | 5/2020 | Diaz et al. |
| 10,768,483 B2 * | 9/2020 | Brown .............. G02F 1/133608 |
| 2001/0009508 A1 | 7/2001 | Umemoto et al. |
| 2001/0033726 A1 | 10/2001 | Shie et al. |
| 2002/0043012 A1 | 4/2002 | Shibata et al. |
| 2002/0126078 A1 | 9/2002 | Horibe et al. |
| 2003/0026085 A1 | 2/2003 | Ueda et al. |
| 2003/0043312 A1 | 3/2003 | Nishida et al. |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0105303 A1 | 5/2005 | Emde |
| 2005/0117323 A1 | 6/2005 | King |
| 2005/0140848 A1 | 6/2005 | Yoo et al. |

(56) References Cited

U.S. PATENT DOCUMENTS

| | | |
|---|---|---|
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0072299 A1 | 4/2006 | Lai |
| 2006/0077686 A1 | 4/2006 | Han et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0092618 A1 | 5/2006 | Tanaka et al. |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0289201 A1 | 12/2006 | Kim et al. |
| 2007/0001997 A1 | 1/2007 | Kim et al. |
| 2007/0013647 A1 | 1/2007 | Lee et al. |
| 2007/0013828 A1 | 1/2007 | Cho et al. |
| 2007/0021217 A1 | 1/2007 | Wu |
| 2007/0070615 A1 | 3/2007 | Joslin et al. |
| 2007/0097321 A1 | 5/2007 | Whitehead et al. |
| 2007/0115686 A1 | 5/2007 | Tyberghien |
| 2007/0127144 A1 | 6/2007 | Gao |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0171676 A1 | 7/2007 | Chang |
| 2007/0177071 A1 | 8/2007 | Egi et al. |
| 2007/0195535 A1 | 8/2007 | Artwohl et al. |
| 2007/0198638 A1 | 8/2007 | Omura et al. |
| 2007/0206158 A1 | 9/2007 | Kinoshita et al. |
| 2007/0222910 A1 | 9/2007 | Hu |
| 2007/0230218 A1 | 10/2007 | Jachim et al. |
| 2007/0268234 A1 | 11/2007 | Wakabayashi et al. |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0158468 A1 | 7/2008 | Kim et al. |
| 2008/0165526 A1 | 7/2008 | Saraiji et al. |
| 2008/0170178 A1 | 7/2008 | Kubota et al. |
| 2008/0170400 A1 | 7/2008 | Maruyama |
| 2008/0192503 A1 | 8/2008 | Laney et al. |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0021461 A1 | 1/2009 | Hu et al. |
| 2009/0033612 A1 | 2/2009 | Roberts et al. |
| 2009/0058795 A1 | 3/2009 | Yamazaki |
| 2009/0061945 A1 | 3/2009 | Ma |
| 2009/0085859 A1 | 4/2009 | Song |
| 2009/0091634 A1 | 4/2009 | Kennedy et al. |
| 2009/0109165 A1 | 4/2009 | Park et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0201441 A1* | 8/2009 | Laney .......... G02F 1/133308 349/64 |
| 2009/0213579 A1 | 8/2009 | Saraiji et al. |
| 2009/0243501 A1 | 10/2009 | Dunn et al. |
| 2009/0244884 A1 | 10/2009 | Trulaske, Sr. |
| 2009/0284457 A1 | 11/2009 | Botzas et al. |
| 2009/0289580 A1 | 11/2009 | Dunn et al. |
| 2010/0039440 A1 | 2/2010 | Tanaka et al. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0231563 A1 | 9/2010 | Dunn et al. |
| 2010/0307800 A1 | 12/2010 | Wee et al. |
| 2010/0313592 A1 | 12/2010 | Pae |
| 2011/0007228 A1 | 1/2011 | Yoon et al. |
| 2011/0013114 A1 | 1/2011 | Dunn et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2011/0283199 A1 | 11/2011 | Schuch et al. |
| 2012/0050958 A1 | 3/2012 | Sanford et al. |
| 2012/0062819 A1 | 3/2012 | Dunn et al. |
| 2012/0086344 A1 | 4/2012 | Schuch |
| 2012/0098794 A1 | 4/2012 | Kleinert et al. |
| 2012/0105424 A1 | 5/2012 | Lee et al. |
| 2012/0134139 A1 | 5/2012 | Jang et al. |
| 2012/0154712 A1 | 6/2012 | Yu et al. |
| 2012/0212520 A1 | 8/2012 | Matsui et al. |
| 2012/0212956 A1 | 8/2012 | Chen |
| 2012/0242926 A1 | 9/2012 | Hsu et al. |
| 2012/0250329 A1 | 10/2012 | Suehiro et al. |
| 2012/0268951 A1 | 10/2012 | Li |
| 2012/0274882 A1 | 11/2012 | Jung |
| 2012/0299891 A1 | 11/2012 | Fujiwara et al. |
| 2012/0314447 A1 | 12/2012 | Huang |
| 2012/0327039 A1 | 12/2012 | Kukulj |
| 2013/0016080 A1 | 1/2013 | Dunn et al. |
| 2013/0016296 A1 | 1/2013 | Fujita et al. |
| 2013/0027633 A1 | 1/2013 | Park et al. |
| 2013/0063326 A1 | 3/2013 | Riegel |
| 2013/0094160 A1 | 4/2013 | Narumi |
| 2013/0163277 A1 | 6/2013 | Kim et al. |
| 2013/0258659 A1 | 10/2013 | Erion |
| 2013/0278868 A1 | 10/2013 | Dunn et al. |
| 2013/0279154 A1* | 10/2013 | Dunn .......... H05K 7/20154 362/97.3 |
| 2014/0016355 A1 | 1/2014 | Ajichi |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0144083 A1 | 5/2014 | Artwohl et al. |
| 2014/0160365 A1 | 6/2014 | Kwong et al. |
| 2014/0268657 A1 | 9/2014 | Dunn et al. |
| 2014/0285477 A1 | 9/2014 | Cho et al. |
| 2014/0340375 A1 | 11/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0219954 A1 | 8/2015 | Kubo |
| 2015/0226996 A1 | 8/2015 | Ohashi |
| 2015/0245443 A1 | 8/2015 | Dunn et al. |
| 2015/0247968 A1 | 9/2015 | Verrat-Debailleul et al. |
| 2015/0346525 A1 | 12/2015 | Wolf et al. |
| 2015/0362768 A1 | 12/2015 | Dunn |
| 2016/0037606 A1 | 2/2016 | Dunn et al. |
| 2016/0103275 A1 | 4/2016 | Diaz et al. |
| 2016/0238876 A1 | 8/2016 | Dunn et al. |
| 2016/0300549 A1 | 10/2016 | Zhang |
| 2016/0334666 A1 | 11/2016 | Liu |
| 2016/0335705 A1 | 11/2016 | Williams et al. |

(56) References Cited

U.S. PATENT DOCUMENTS

| | | |
|---|---|---|
| 2016/0338181 A1 | 11/2016 | Schuch et al. |
| 2016/0338182 A1 | 11/2016 | Schuch et al. |
| 2016/0351133 A1 | 12/2016 | Kim et al. |
| 2016/0358538 A1 | 12/2016 | Schuch et al. |
| 2017/0059938 A1 | 3/2017 | Brown et al. |
| 2017/0248823 A1 | 8/2017 | Dunn et al. |
| 2018/0012566 A1 | 1/2018 | Lin et al. |
| 2018/0048849 A1 | 2/2018 | Dunn |
| 2018/0061297 A1 | 3/2018 | Schuch et al. |
| 2019/0079335 A1 | 3/2019 | Dunn et al. |
| 2019/0154909 A1 | 5/2019 | Dunn |
| 2019/0155103 A1 | 5/2019 | Brown et al. |
| 2020/0233265 A1 | 7/2020 | Diaz et al. |

FOREIGN PATENT DOCUMENTS

| | | |
|---|---|---|
| CA | 2536130 A1 | 5/2005 |
| CA | 2688214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| GB | 153110 | 11/1920 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2004325629 A | 11/2004 |
| JP | 2005228996 A | 8/2005 |
| JP | 2005236469 | 9/2005 |
| JP | 2005-292939 A | 10/2005 |
| JP | 2008518251 A | 10/2005 |
| JP | 2005-332253 A | 12/2005 |
| JP | 2006-198344 A | 8/2006 |
| JP | 2007080872 A | 3/2007 |
| JP | 2009535723 A5 | 5/2007 |
| JP | 200876755 A | 4/2008 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2010282109 A | 12/2010 |
| JP | 2011081424 A | 4/2011 |
| JP | 2014-71343 A | 4/2014 |
| KR | 20-0286961 Y1 | 8/2002 |
| KR | 1020070003755 A | 2/2006 |
| KR | 20070005637 A | 1/2007 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 1020050033986 A | 4/2014 |
| KR | 101796718 A | 11/2017 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2005093703 A1 | 10/2005 |
| WO | WO2006001559 A1 | 1/2006 |
| WO | WO2006109237 A1 | 10/2006 |
| WO | WO2007052777 A1 | 5/2007 |
| WO | WO2005040873 A1 | 5/2008 |
| WO | WO2008138049 A | 11/2008 |
| WO | WO2008152832 A1 | 12/2008 |
| WO | WO2009004574 A1 | 1/2009 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2014/034546 A1 | 3/2014 |
| WO | WO2014158642 A1 | 10/2014 |
| WO | WO2015003130 A1 | 1/2015 |
| WO | WO2018031753 A1 | 2/2018 |

OTHER PUBLICATIONS

Patrick Frantz & Deania Fernandez, Printed Circuit Boards (PCBs), Feb. 18, 2004, 2 Pages, Version 1.1.

Teravision Corp., LCD-TV Panel Control Board Specification, Nov. 2007, 24 Pages.

Supertex Inc., Constant Off-time, Buck-based LED Drivers Using HV9910, Nov. 2, 2004, 4 Pages.

Grin Tech, Grin Lenses, Aug. 25, 2016, 4 Pages.

Supertex Inc., Universal High Brightness LED Driver, 2007, 8 Pages.

Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.

Panel-Brite, Inc., High Brightness LED Backlight Technology, Mar. 11, 2009, 1 Page.

RPO, How Digital Waveguide Touch Works, Sep. 15, 2011, 1 Page.

Dave Roos, How Transmissive Film Works, article, 2008, 9 pages.

Schott, Glass made of Ideas—Opalika, 2016, 2 pages.

Anandan, LED Backlight: Enhancement of picture quality on LCD screen, Oct. 8-12, 2006, 5 pages.

Lu, Color shift reduction of a multi-domain IPS-LCD using RGB-LED backlight, 2006, 10 pages.

Anandan, M., Progress of LED backlights for LCDs, Journal of the SID, 2008, pp. 287-310, 16/2.

\* cited by examiner

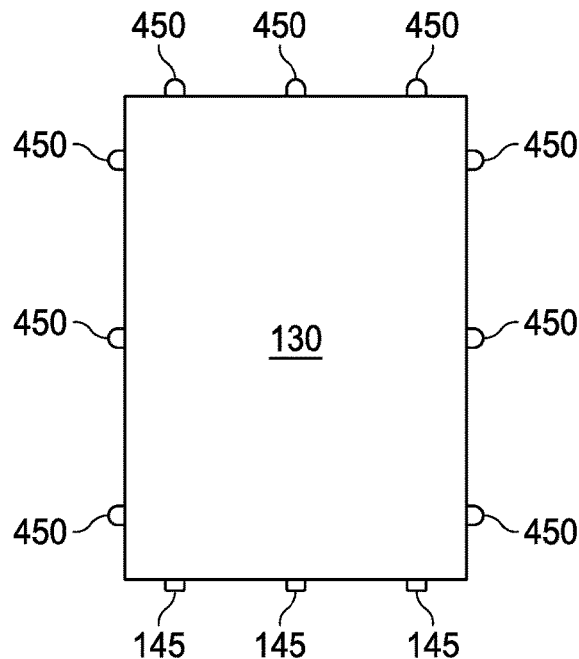 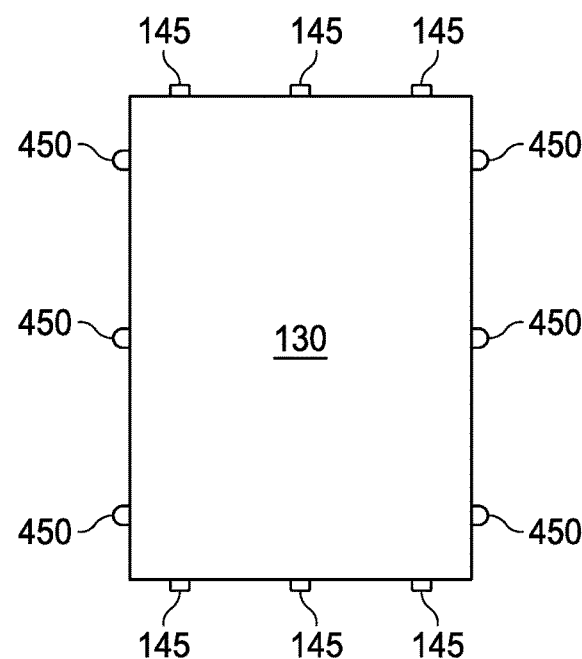
FIG. 7A  FIG. 7B
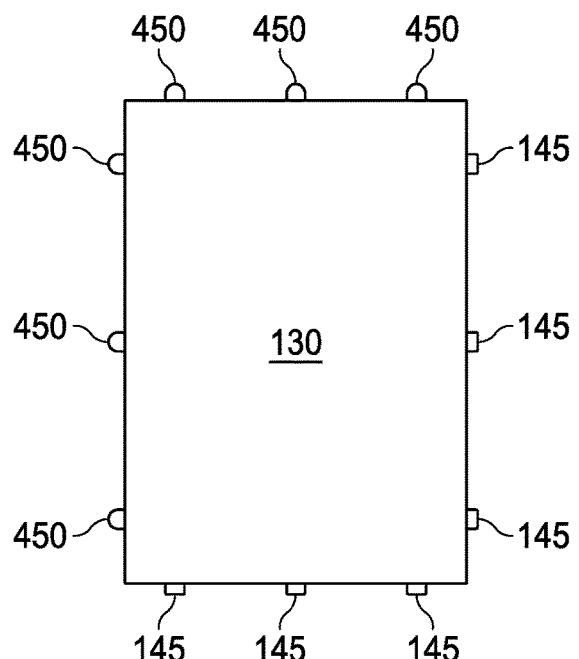 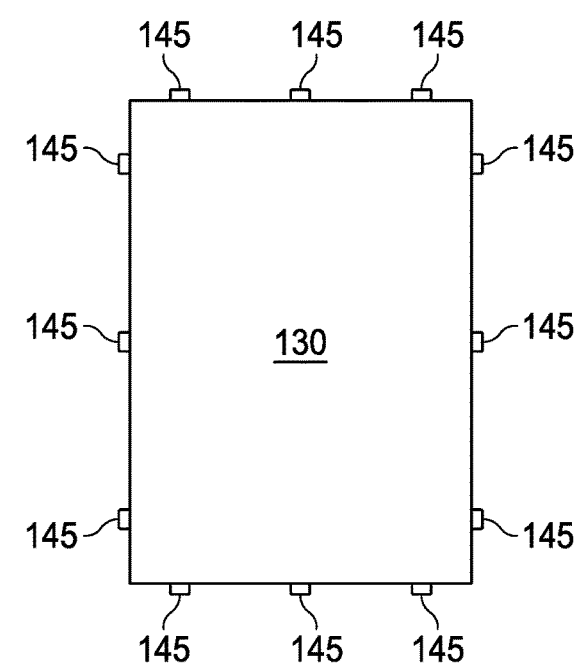
FIG. 7C  FIG. 7D

OPTICAL SHEET TENSIONING DEVICE

CROSS-REFERENCE TO RELATED APPLICATIONS

This application is a continuation of U.S. application Ser. No. 16/250,649 filed Jan. 17, 2019, which is a continuation of U.S. application Ser. No. 15/252,959 filed Aug. 31, 2016, which claims the benefit of U.S. Provisional Application No. 62/212,662 filed Sep. 1, 2015, the disclosures of all of which are hereby incorporated by reference in their entireties.

TECHNICAL FIELD

Embodiments generally relate to backlighting assemblies with optical sheets.

BACKGROUND ART

Liquid crystal displays (LCDs) are now being used in many environments which are not protected from direct sunlight, shock, or high/low ambient temperatures.

The various layers used to construct an LCD are typically very thin, as the thinner LCD assemblies have been more popular in the marketplace and are typically more appealing to the consumer. However, thin components have been difficult to form into a resulting assembly that is durable enough to withstand this particular application and all of the competing environmental factors, while still producing a very bright, high quality image that does not degrade over time.

SUMMARY OF THE EXEMPLARY EMBODIMENTS

Exemplary embodiments provide a spring tensioning assembly for an optical sheet. In some embodiments the tensioning springs are provided as flat or leaf springs while in other embodiments the tensioning springs can be traditional extension springs or torsion springs.

The foregoing and other features and advantages of the exemplary embodiments of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIGS. 7A-7D provide top plan views for various embodiments for the placement of tensioner springs and securing posts on various perimeter edges of the optical sheet.

DETAILED DESCRIPTION

Figure 1:
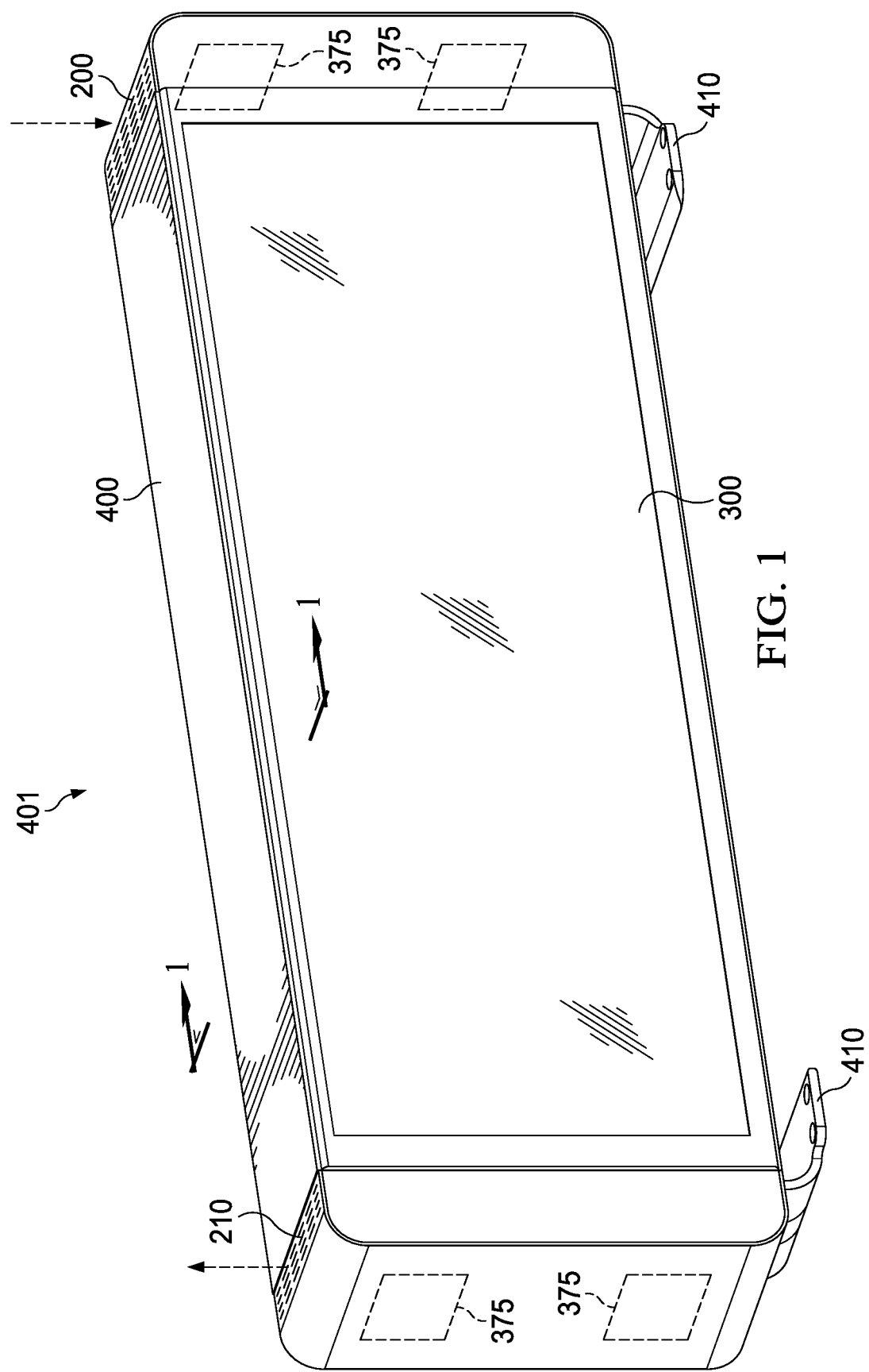
FIG. 1 is a perspective view of an exemplary embodiment of an assembly for back to back LCDs and showing the section line 1-1.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a car top assembly 401 for back to back LCDs and showing the section line 1-1. A housing 400 preferably contains and protects the components and has mounting plates 410 as well as an ambient air inlet 200 and ambient air outlet 210. The housing 400 is preferably metal but this is not required. A transparent protective plate 300 is used to protect the internal LCD. In an exemplary embodiment the plate 300 would be glass and would contain at least one anti-reflective layer or coating. In some embodiments the plate 300 may be a single pane of tempered glass while in other embodiments the plate 300 may be two pieces of anti-reflective glass laminated together with optical adhesive.

Fans 375 may be positioned within the housing 400 to force the ambient air through the inlet 200 and outlet 210. Fans 375 could be positioned anywhere within the housing 400, but are preferably near either the inlet 200 or outlet 210. Fans 375 may be placed near both the inlet 200 and outlet 210 or only near one of the two. Section line 1-1 is shown cutting vertically through the assembly 401.

Figure 2:
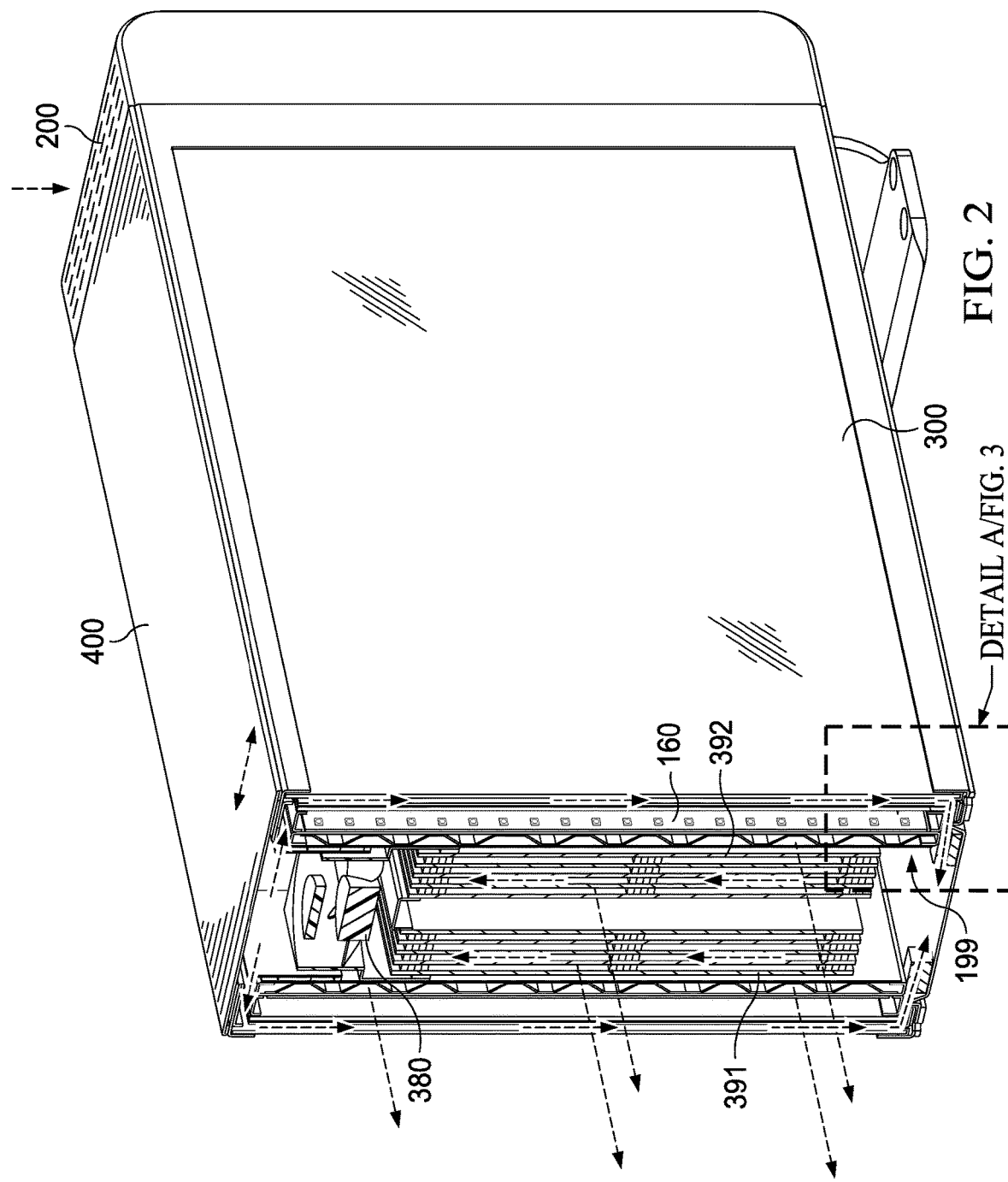
FIG. 2 is a perspective section view of the assembly taken from section line 1-1 and showing the location for detail A.

FIG. 2 is a perspective section view of the car top assembly taken from section line 1-1 and showing the location for detail A. In an exemplary embodiment, the assembly is substantially symmetrical about a vertical center plane, so the assembly will be described mostly with reference to a first side, as the second side is substantially the same in a preferred embodiment. Both the first and second sides preferably contain an embodiment of the LCD assembly 199. The assembly preferably contains two paths for cooling air. The first path (open loop) is ambient air which is drawn through the inlet 200 and preferably forced through a first heat exchanger 392, second heat exchanger 391, behind a first backlight 160, and behind a second backlight. The open loop is forced by the fans 375 described above.

The second path (closed loop) may be used to force circulating air through a first heat exchanger 392, second heat exchanger 391, between the protective plate 300 and a first LCD, and between a second protective plate and a second LCD. The circulating gas is preferably forced through the closed loop path by fan 380, which could be placed anywhere in the path of the closed loop, but here is shown above the first and second heat exchangers 392 and 391.

Figure 3:
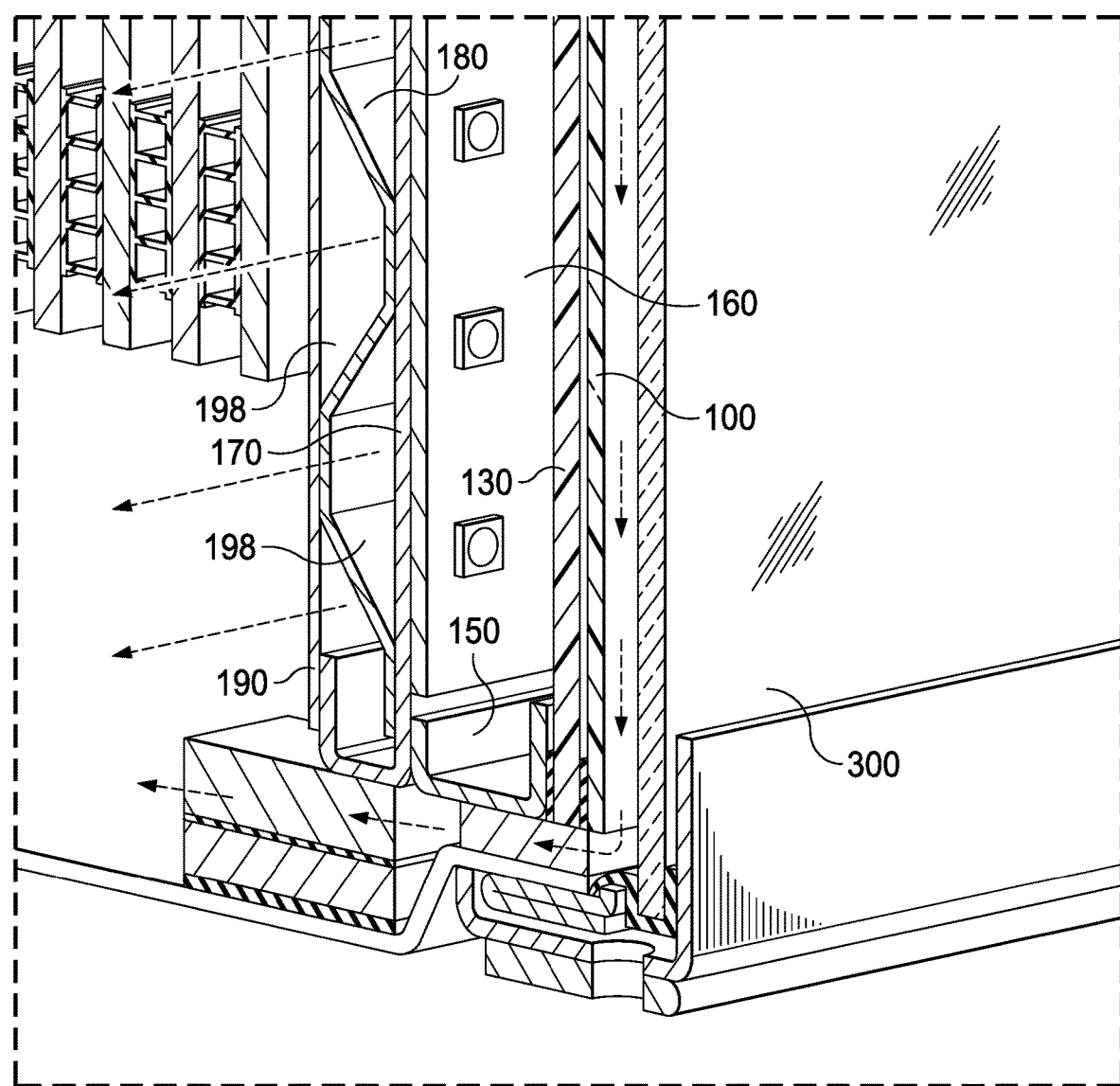
FIG. 3 is a perspective section view of detail A.

FIG. 3 is a perspective section view of detail A. The LCD assembly 199 preferably contains an LCD 100 as the outermost layer. A gap is preferably defined between the LCD 100 and the plate 300, which may accept the closed loop circulating gas. The backlight 160 is preferably positioned behind the optical sheet 130 and is preferably in conductive thermal communication with a front thermal plate 170. An optional corrugated layer 180 is preferably sandwiched between the front thermal plate 170 and a rear thermal plate 190. Preferably, the corrugated layer 180 is in conductive thermal communication with the front thermal plate 170 and rear thermal plate 190. In an exemplary embodiment, the front thermal plate 170, rear thermal plate 190, and corrugated layer 180 are all comprised of metal and even more preferably of aluminum or stainless steel.

A series of channels 198 may be defined by the combination of the front thermal plate 170, rear thermal plate 190, and corrugated layer 180. The channels 198 guide the open loop air and allow heat to be removed from the backlight 160 by transferring to the heat to the front thermal plate 170, rear thermal plate 190, and corrugated layer 180. In some embodiments, the corrugate layer 180 may not be used, but the open loop air is simply forced between the front thermal plate 170 and rear thermal plate 190.

Figure 4:
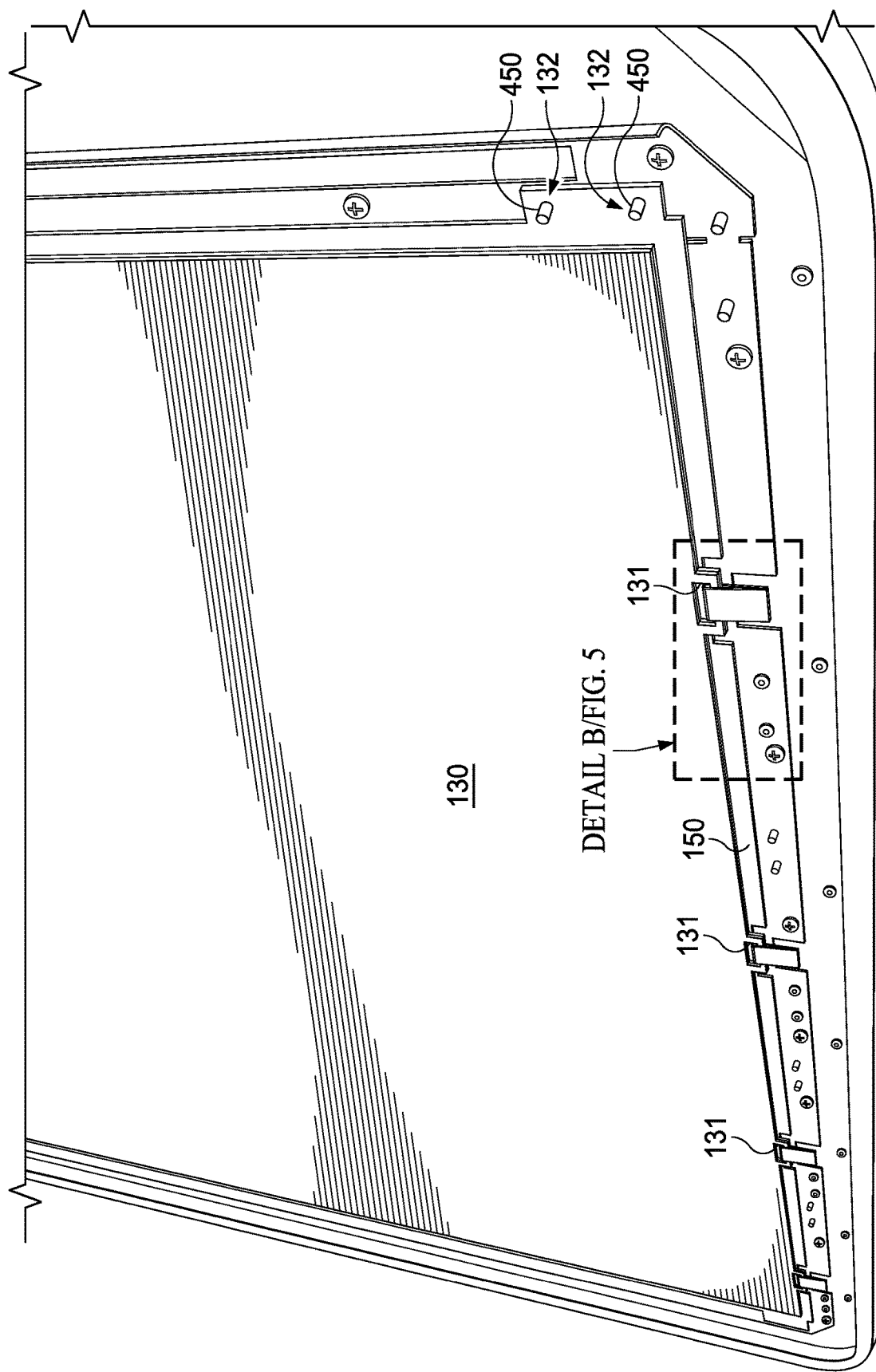
FIG. 4 is a top plan view of the embodiments shown above where the transparent protective plate and the LCD have been removed, and indicating the location for detail B.

FIG. 4 is a top plan view of the embodiments shown above where the transparent protective plate 300 and the LCD 100 have been removed, and indicating the location for detail B. The optical sheet 130 is generally a thin plastic sheet which has a size and shape that is similar to that of the LCD 100 and may be configured to diffuse or otherwise scatter light. As further illustrated in FIG. 9, the optical sheet 130 may comprise one or more of the following, a diffuser 512, a light diffusion film (LDF) 514, a dual brightness enhancement film (DBEF) 518, a brightness enhancement film (BEF) 516, a polarizer, and an anti-reflective film. These are merely exemplary, those having an ordinary level of skill in the arts will recognize that any type of optical sheet, stack, and/or film may be used with the present invention in any combination, the components of which may be used to diffuse, scatter, collimate, polarize, enhance, or otherwise alter the light passing therethrough. The optical sheet 130 preferably has four perimeter edges, where one or more of the edges may be secured to the 150, preferably by passing a post 450 from the backlight wall 150 through an aperture 132 placed near the perimeter edge of the optical sheet 130. Any number of posts 450 and corresponding apertures 132 may be used. At least one perimeter edge of the optical sheet 130 preferably contains one or more apertures 131 for tensioning the optical sheet 130.

Figure 5:
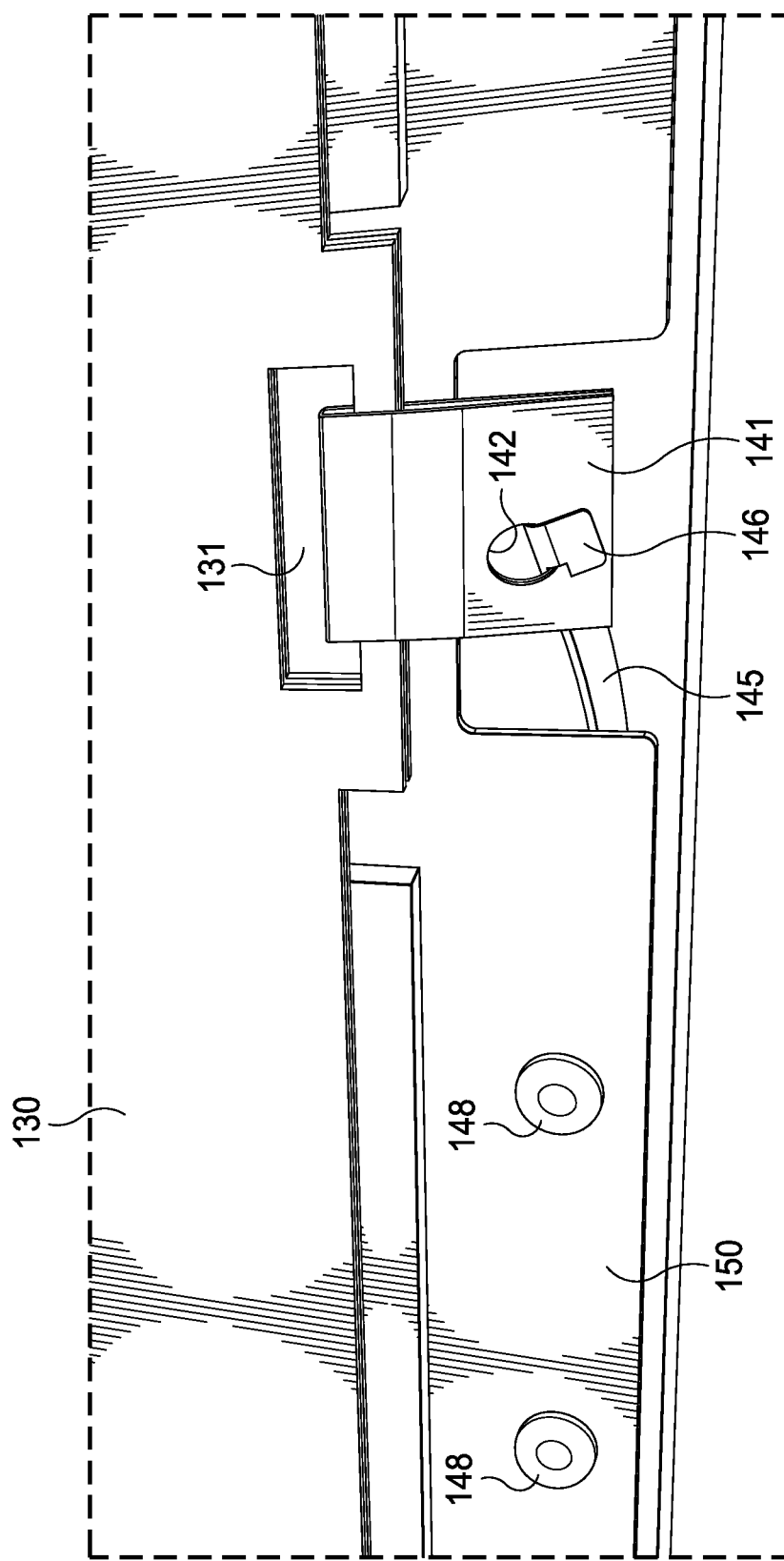
FIG. 5 is a top plan view of detail B.

FIG. 5 is a top plan view of detail B. A tensioner spring 145 preferably contains a hook 146 or similar means for attaching the tensioner spring 145 to the aperture 131 in the optical sheet 130. In some embodiments, the hook 146 may be inserted directly into the aperture 131. In other embodiments, as shown here, an intermediary element 141 passes through the aperture 131 and connects with the tensioner spring 145. Here, the intermediary element 141 comprises a strip of flexible material (preferably plastic or sheet metal) which passes through the aperture 131 and is folded over upon itself. An aperture 142 is preferably placed on the intermediary element 141 to provide a location for the hook 146 of the tensioner spring 145. In this embodiment, the aperture 142 passes through the intermediary element 141 twice since the intermediary element 141 is folded over upon itself. Preferably, the apertures 131 in the optical sheet 130 are slots while the apertures 142 in the intermediary element 141 are round holes. However, if the hook 146 of the tensioner spring 145 were to connect directly with the optical sheet 130, then the apertures 131 in the optical sheet 130 would preferably be rounded holes.

Although shown herein with a leaf or flat spring design, the tensioner spring 145 could be any number of biasing elements including but not limited to traditional extension springs as well as torsion springs. In the particular design shown, one or more posts 148 are used to create a first portion of the tensioner spring 145 that is substantially parallel to the adjacent edge of the optical sheet 130. While posts 148 are used here, this could also be any surface which is substantially parallel to the adjacent edge of the optical sheet 130 or any element to keep the first portion of the tensioner spring 145 substantially parallel to the adjacent edge of the optical sheet 130. Thus, in this embodiment the tensioner spring 145 contains a first portion which is substantially parallel to the adjacent edge of the optical sheet 130 and a second portion which angles towards the optical sheet 130 and contains an end having the hook 146 (or other means for attaching to the apertures 131 or 142).

Figure 6:
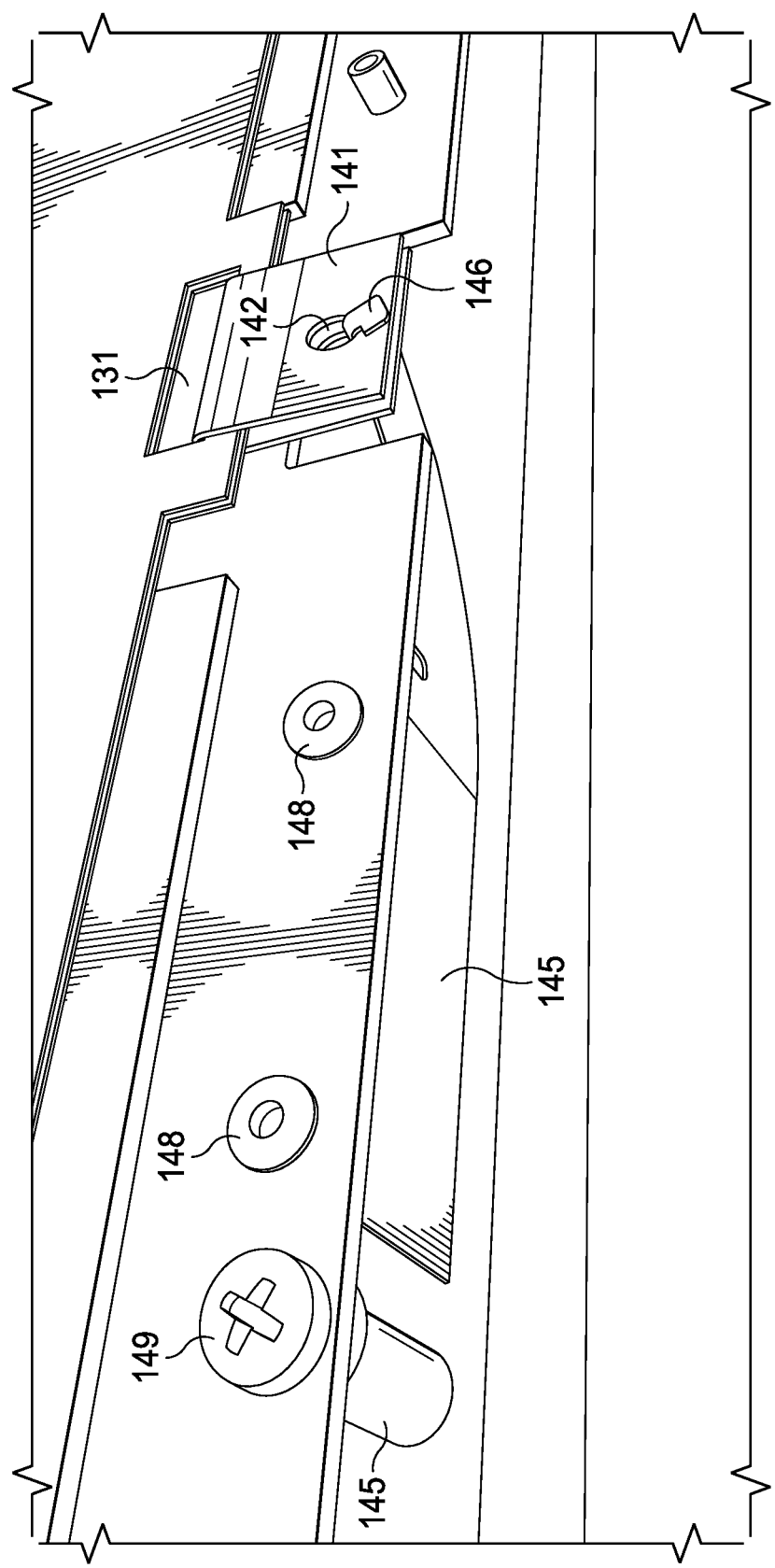
FIG. 6 is a top perspective view of detail B.

FIG. 6 is a top perspective view of detail B. The end of the tensioner spring 145 which is opposite the hook 146 preferably contains a hollow portion 145 which can accept a locating post 149 (which is shown here as a threaded fastener, but this is not required as any object which fits within the hollow portion 145 will perform adequately).

FIGS. 7A-7D provide top plan views for various embodiments for the placement of tensioner springs 145 and securing posts 450 on various perimeter edges of the optical sheet 130. The embodiment of FIG. 7A uses securing posts 450 along each edge except for one edge which contains the tensioner springs 145. The embodiment of FIG. 7B provides tensioner springs 145 along two opposing edges of the optical sheet 130 while the remaining edges contain securing posts 450. The embodiment of FIG. 7C shows tensioner springs 145 along two adjacent perimeter edges of the optical sheet 130 while the remaining edges (the opposite set of adjacent perimeter edges) contain securing posts 450. The embodiment of FIG. 7D provides tensioner springs 145 along each perimeter edge of the optical sheet 130. It should be noted that although shown in a rectangular-portrait orientation, this is not required by any of the claims as all teachings could be applied to rectangular-landscape orientation or displays which are square. These embodiments are merely exemplary, any location of tensioner springs 145 and securing posts 450 is contemplated.

Figure 8:
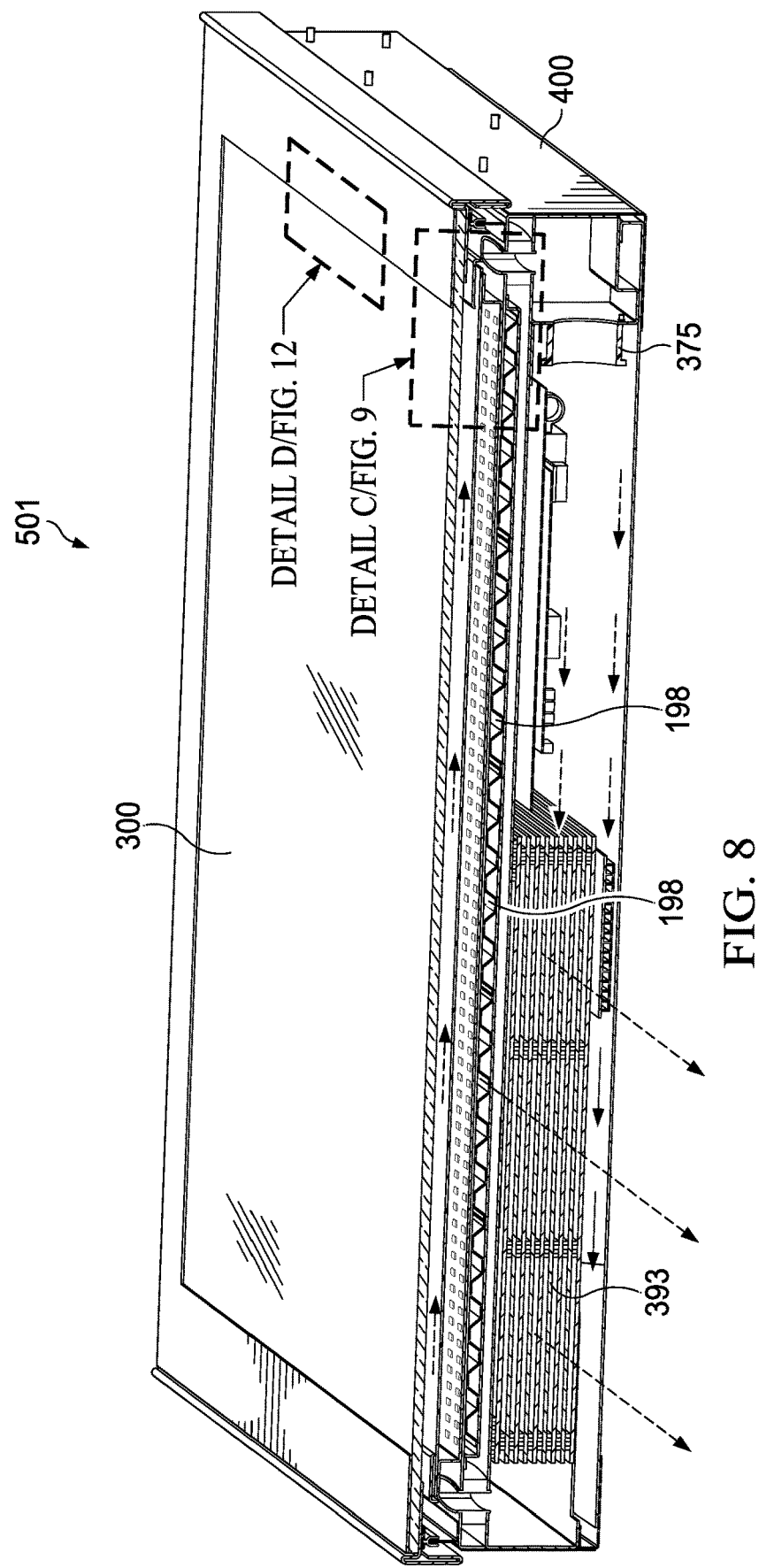
FIG. 8 is a side perspective sectional view of another exemplary embodiment of the present invention showing Detail C and Detail D.

FIG. 8 is a side perspective sectional view of another exemplary electronic display assembly 501 in accordance with the present invention. Similar to other embodiments described herein, the assembly may comprise the housing 400, the plate 300, and an open and closed loop of gas, which may be propelled by one or more of the fans 375 positioned at various locations within the housing 400. In exemplary embodiments of the present invention, the open loop may be comprised of ambient air and may travel through a series of channels 198 and a heat exchanger 393. A closed loop of circulating gas may travel between the LCD 100 and the plate 300, vertically along the upper and lower edges of the assembly 501 and across the bottom of the housing 400. The circulating gas may travel vertically by way of one or more pass through apertures 510.

Figure 9:
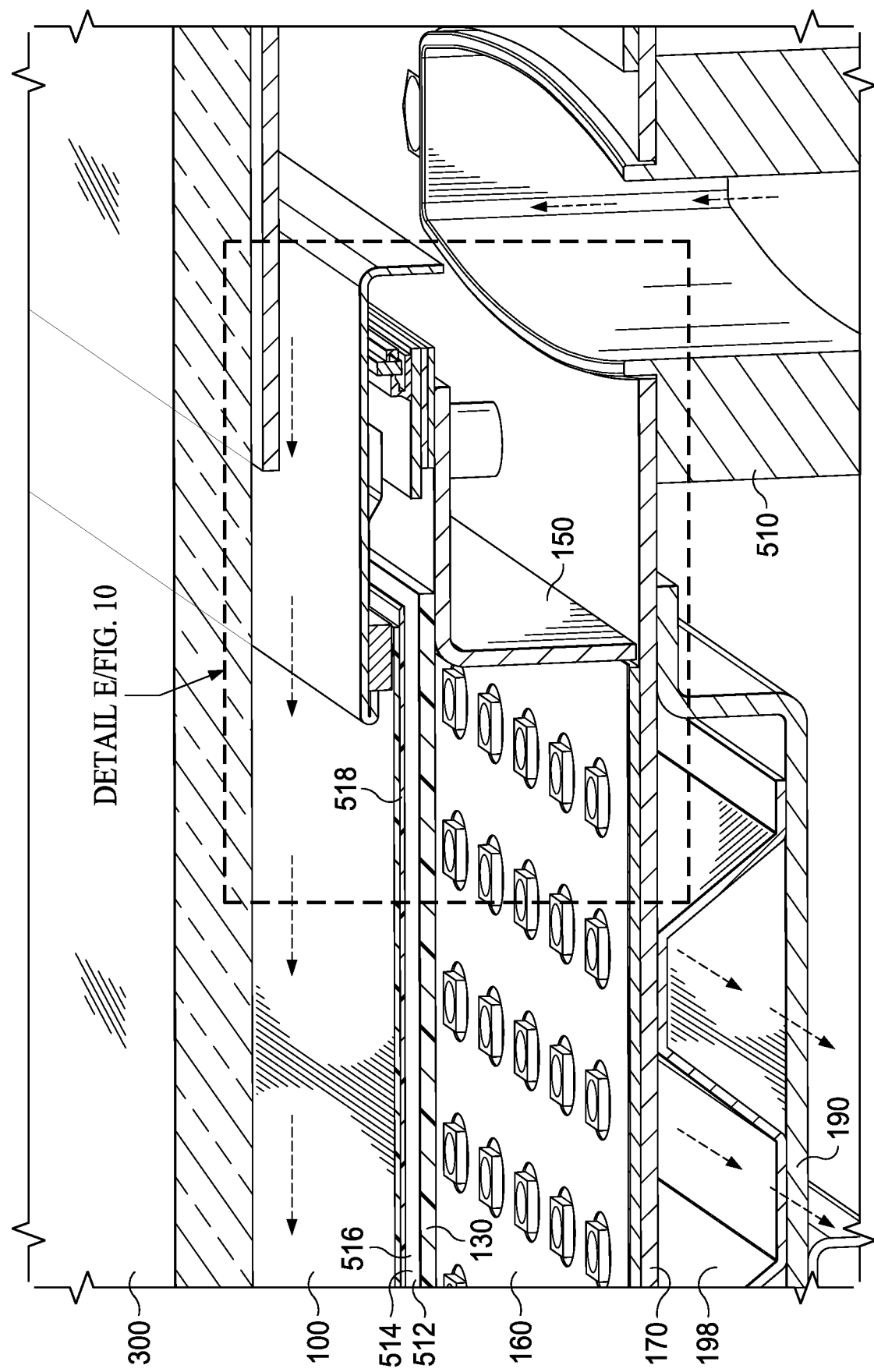
FIG. 9 is a detailed side perspective sectional view of Detail C of FIG. 8, also showing Detail E.
Figure 10:
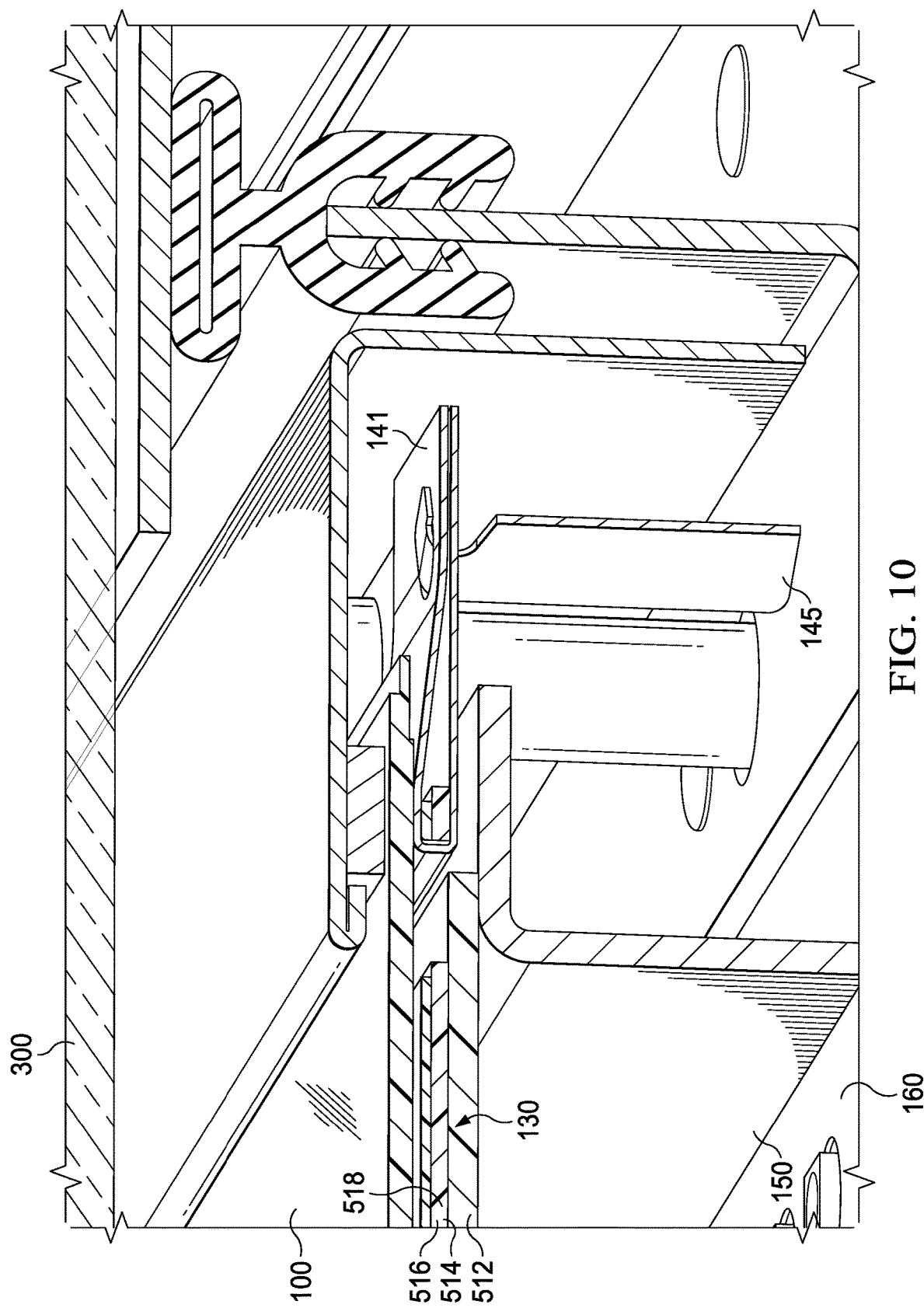
FIG. 10 is a detailed front perspective sectional view of Detail E of FIG. 9.

FIG. 9 is a detailed side perspective sectional view of Detail C. The optical sheet 130 may comprise one or more of the following, the diffuser 512, the light diffusion film (LDF) 514, the dual brightness enhancement film (DBEF) 518, the brightness enhancement film (BEF) 516, the polarizer, and the anti-reflective film. These are merely exemplary, those having an ordinary level of skill in the arts will recognize that any type of optical sheet, stack, and/or film may be used with the present invention in any combination, the components of which may be used to diffuse, scatter, collimate, polarize, enhance, or otherwise alter the light passing therethrough FIG. 10 is a detailed section view of Detail E, shown from a front view. The backlight wall 150 may be curved such that it contacts the backlight 160 and the optical sheet 130 in an "S" type shape. In exemplary embodiments of the present invention, the backlight wall 150 may contact the diffuser 512, though in other exemplary embodiments the backlight wall 150 may contact other elements of the optical sheet 130. The spring assembly 145 may reside in the space created by the curved shape of the backlight wall 150, though any location is contemplated. The intermediary element 141 may be attached to the optical sheet 130. Preferably, the intermediary element 141 may wrap around one or more layers of the optical sheet 130.

Figure 11:
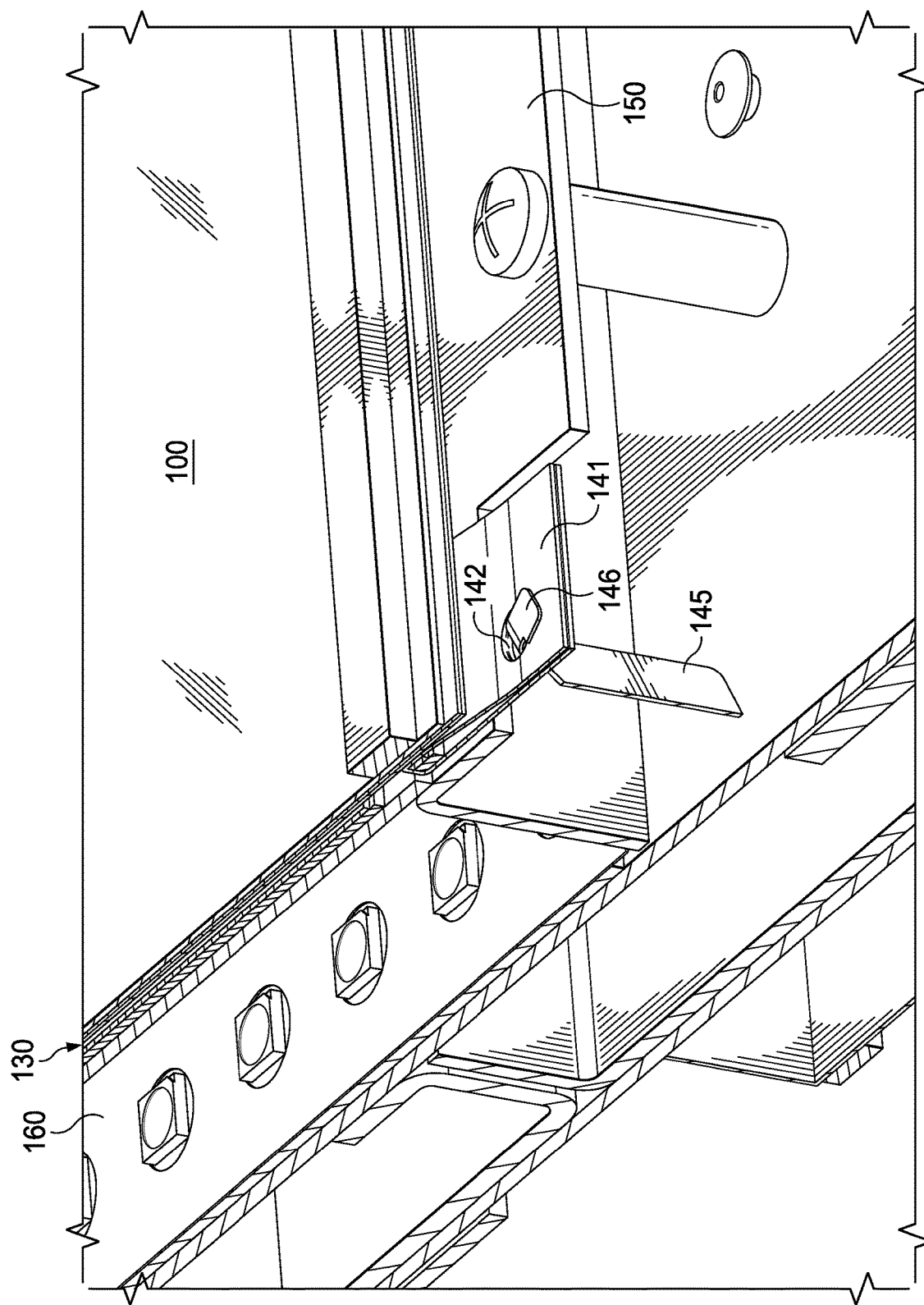
FIG. 11 is a top perspective sectional view of Detail E of FIG. 9.

FIG. 11 is a detailed sectional view of Detail E from a rear perspective. The intermediary element 141 may rest beneath the LCD 100. Therefore, it is desirable that the intermediary element 141 be comprised of a material of high stiffness (so as to transfer the tensioning force to the optical sheet 130), tear-resistance (so the hook 146 does not enlarge, tear, or otherwise compromise the aperture 142), thin (so at to not add thickness to the assembly 501), and smooth (such that it does not scratch the LCD 100). In exemplary embodiments of the present invention, the intermediary element 141 may be comprised of a polymer, a reinforced tape, or a woven material, though any material is contemplated.

Figure 12:
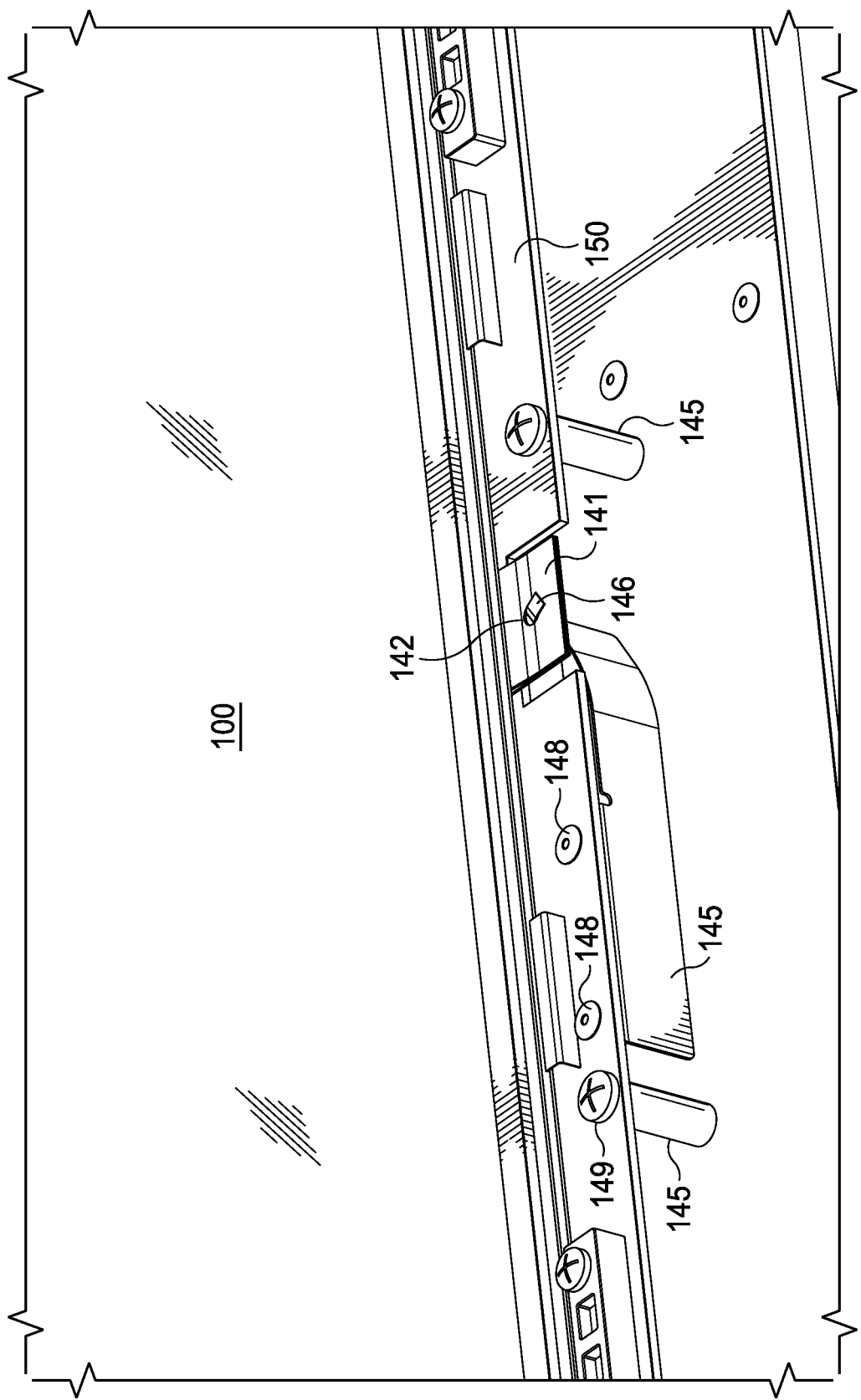
FIG. 12 is a detailed top perspective sectional view of Detail D of FIG. 8, shown with the plate 300 removed.

FIG. 12 is a detailed top perspective sectional view of Detail D of FIG. 8, shown with the plate 300 removed. The tensioner spring 145 may be biased such that it would normally extend substantially parallel to the edge of the backlight wall 150. The first portion of the tensioner spring 145 be retrained by the posts 148 and a second portion of the tensioner spring 145 may be manipulated upward and made to engage the intermediary element 141 such that the tensioner spring 145 creates a downward force against the intermediary element 141 and thus the optical sheet 130.

Figure 13:
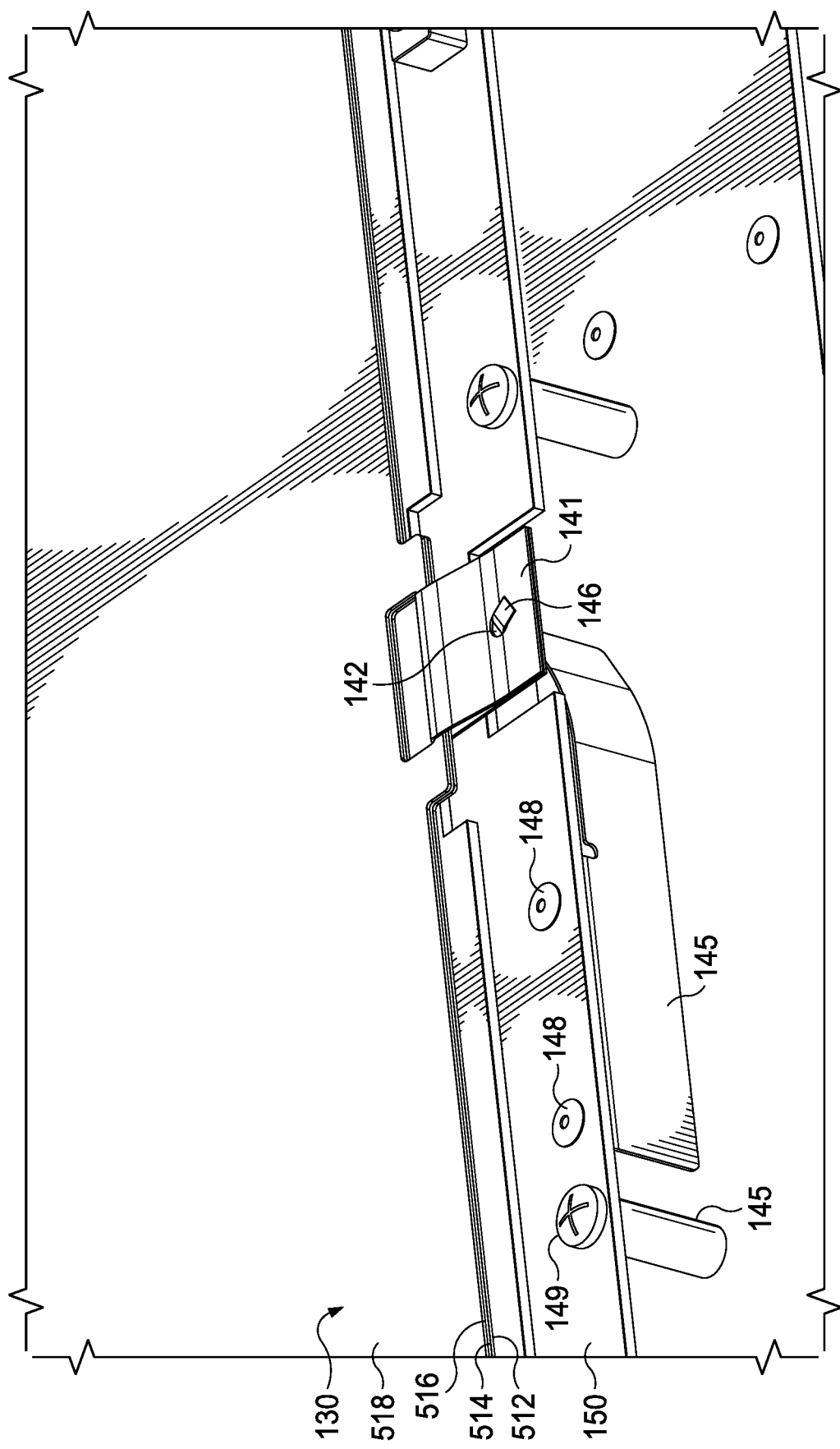
FIG. 13 is a detailed top perspective sectional view of Detail D of FIG. 8, shown with the plate 300 and the LCD 100 removed.

FIG. 13 is a detailed top perspective sectional view of Detail D of FIG. 8, shown with the plate 300 and the LCD 100 removed to expose the optical sheet 130. As illustrated, the optical sheet 130 may be comprised of multiple layers such as the diffuser 512, the light diffusion film (LDF) 514, the dual brightness enhancement film (DBEF) 518, and the brightness enhancement film (BEF) 516. The intermediary element 141 may wrap around and engage one or more of these layers, thus providing a tensioning force against these layers.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An assembly for enhancing electronic images, said assembly comprising:
    an electronic display layer for displaying said electronic images;
    an optical sheet located adjacent to the electronic display layer and defining a perimeter;
    a housing for said electronic display layer and said optical sheet; and
    a number of tensioning subassemblies, each tensioning subassembly configured to dynamically exert tensioning forces on said optical sheet and comprising:
        a first component attached to a location along the perimeter of said optical sheet; and
        a second component connected to said first component and said housing.

2. The assembly of claim 1 further comprising:
    a protective layer located forward of said electronic display layer and forming part of said housing.

3. The assembly of claim 1 further comprising:
    a number of illumination devices positioned to illuminate said electronic display layer.

4. The assembly of claim 3 further comprising:
    a backlight panel located rearward of said electronic display layer and said optical sheet, wherein said illumination devices are arranged on said backlight panel to provide a direct lighting arrangement for said electronic display layer.

5. The assembly of claim 4 wherein:
    each of said illumination elements comprise at least one light emitting diode.

6. The assembly of claim 1 wherein:
    said electronic display layer comprises liquid crystals.

7. The assembly of claim 1 wherein:
    said first component of each of said tensioning subassemblies comprise an intermediary element; and
    said second component of each of said tensioning subassemblies comprise a leaf spring.

8. The assembly of claim 7 wherein:
each of said tensioning subassemblies comprise a post extending through said optical sheet and engaging a first portion of the leaf spring such that the first portion of said leaf spring extends substantially parallel to an adjacent edge of said optical sheet.

9. The assembly of claim 8 wherein:
each of said tensioning subassemblies comprise a locating post extending through said optical sheet and engaging an end of said leaf spring.

10. The assembly of claim 9 wherein:
at least three tensioning subassemblies are located on each side of the perimeter of said optical sheet.

11. The assembly of claim 1 wherein:
the optical sheet comprises brightness enhancement elements.

12. The assembly of claim 1 wherein:
the optical sheet comprises light diffusion elements.

13. The assembly of claim 1 wherein:
the optical sheet comprises at least one polarizer, anti-reflective film, brightness enhancement film, dual brightness enhancement film, diffuser, or light diffusion film.

14. The assembly of claim 1 further comprising:
an intake aperture in said housing for accepting ambient air;
an exhaust aperture in said housing for discharging ambient air; and
an open loop pathway through said housing for said ambient air.

15. The assembly of claim 14 further comprising:
a closed loop pathway through said housing for circulating gas; and
a heat exchanger located within said housing and comprising a first portion forming part of said closed loop pathway and a second portion forming part of said open loop pathway.

16. The assembly of claim 15 wherein:
said closed loop pathway encircles the electronic display layer.

17. An assembly for enhancing electronic images, said assembly comprising:
a backlight;
an optical stack for display of said electronic images positioned in front of said backlight, said optical stack comprising:
an electronic display layer; and
at least one optical sheet positioned between said electronic display layer and said backlight, wherein said at least one optical sheet is configured to modify light passing therethrough;
a housing for said backlight and said optical stack; and
a number of tensioning subassemblies, each attached to a perimeter location of each of said at least one optical sheet at a first portion thereof, and each attached to an adjacent perimeter location of said housing at a second portion thereof, wherein said tensioning subassemblies is configured to dynamically exert tensioning forces on each of said optical sheets.

18. The assembly of claim 17 wherein:
each of said tensioning subassemblies comprise:
a post affixed to said housing;
an intermediary element extending from said post; and
a hook at a distal portion of said intermediary element;
each of said at least one optical sheet comprise apertures configured to receive said hooks of said tensioning subassemblies.

19. The assembly of claim 17 wherein:
each of said at least one optical sheet is selected from the group consisting of: a polarizer, an anti-reflective film, a brightness enhancement film, a dual brightness enhancement film, a diffuser, and a light diffusion film.

20. An assembly for enhancing electronic images, said assembly comprising:
a backlight;
an optical stack for display of said electronic images positioned in front of said backlight, said optical stack comprising:
an electronic display layer comprising liquid crystals; and
a plurality of optical sheets, each positioned between said electronic display layer and said backlight, wherein each of said optical sheets are configured to modify light passing from said backlight to said electronic display layer, and
wherein each of said optical sheets comprise a number of apertures located along
a perimeter of each of said optical sheets;
a housing for said backlight and said optical stack;
a protective cover located forward of said optical stack and forming a portion of said housing;
a number of tensioning subassemblies, each configured to provide tensioning forces to said optical sheet and comprising:
a post affixed to said housing;
an intermediary element extending from said post; and
a hook at a distal portion of said intermediary element and configured to pass through one of the apertures in said optical sheets; and
at least one airflow pathway through said housing.

* * * * *